United States Patent
Yamazaki (10) Patent No.: US 8,699,157 B2
(45) Date of Patent: Apr. 15, 2014

(54) VARIABLE FOCUS PRISM AND OPTICAL SYSTEM

(75) Inventor: Shoichi Yamazaki, Yokohama (JP)

(73) Assignee: Canon Kabushiki Kaisha (JP)

( * ) Notice: Subject to any disclaimer, the term of this patent is extended or adjusted under 35 U.S.C. 154(b) by 120 days.

(21) Appl. No.: 13/316,628

(22) Filed: Dec. 12, 2011

(65) Prior Publication Data

US 2012/0154939 A1 Jun. 21, 2012

(30) Foreign Application Priority Data

Dec. 20, 2010 (JP) ................................. 2010-283595

(51) Int. Cl.
*G02B 5/06* (2006.01)

(52) U.S. Cl.
USPC .......................................................... 359/832

(58) Field of Classification Search
USPC .................................................. 359/833–836
See application file for complete search history.

(56) References Cited

U.S. PATENT DOCUMENTS

| | | | | |
|---|---|---|---|---|
| 4,289,379 A * | 9/1981 | Michelet | | 359/666 |
| 6,764,187 B2 * | 7/2004 | Ryutov et al. | | 359/846 |
| 6,945,658 B2 * | 9/2005 | Borra et al. | | 359/846 |
| 6,999,649 B1 * | 2/2006 | Chen et al. | | 385/18 |
| 7,230,771 B2 | 6/2007 | Kuiper et al. | | |
| 7,385,755 B2 * | 6/2008 | Hendriks et al. | | 359/365 |
| 7,525,722 B2 * | 4/2009 | Kolodner et al. | | 359/296 |
| 7,595,925 B2 * | 9/2009 | Valette et al. | | 359/290 |
| 7,706,077 B2 * | 4/2010 | Batchko et al. | | 359/665 |
| 7,808,717 B2 * | 10/2010 | Kuiper et al. | | 359/665 |
| 7,864,439 B1 * | 1/2011 | Hickerson | | 359/666 |
| 7,978,400 B2 * | 7/2011 | Takemoto et al. | | 359/316 |
| 8,068,229 B2 * | 11/2011 | Kolodner et al. | | 356/445 |
| 2001/0017985 A1 * | 8/2001 | Tsuboi et al. | | 396/506 |
| 2005/0117232 A1 * | 6/2005 | Forsberg | | 359/843 |
| 2006/0028734 A1 * | 2/2006 | Kuiper et al. | | 359/676 |
| 2007/0139751 A1 * | 6/2007 | Kuiper et al. | | 359/223 |
| 2008/0084614 A1 * | 4/2008 | Dobrusskin | | 359/665 |
| 2008/0117521 A1 * | 5/2008 | Krupenkin et al. | | 359/665 |
| 2009/0067027 A1 * | 3/2009 | Hennigan | | 359/228 |
| 2009/0103159 A1 * | 4/2009 | Cheng et al. | | 359/228 |
| 2009/0122417 A1 * | 5/2009 | Hou | | 359/665 |

FOREIGN PATENT DOCUMENTS

| | | |
|---|---|---|
| JP | 2001004809 A | 1/2001 |
| JP | 2007121980 A | 5/2007 |
| JP | 2008191647 A | 8/2008 |

* cited by examiner

*Primary Examiner* — Euncha Cherry (74) *Attorney, Agent, or Firm* — Rossi, Kimms & McDowell LLP (57) ABSTRACT

A variable focus prism has a first transmissive solution body, a second transmissive solution body that has a different refractive index to that of the first transmissive solution body, and a reflective solution body. The variable focus prism varies the shape of the transmissive surface and the reflective surface by electrical control of the transmissive surface formed on the interface between the first transmissive solution body and the second transmissive solution body, and the reflective surface formed on the interface between the second transmissive solution body and the reflective solution body.

6 Claims, 4 Drawing Sheets

VARIABLE FOCUS PRISM AND OPTICAL SYSTEM

BACKGROUND OF THE INVENTION

1. Field of the Invention

The present invention relates to a variable focus prism and to an optical system using the same.

2. Description of the Related Art

There is a conventional technique that uses a prism configured from at least three surfaces being surfaces that allow transmission and surfaces that reflect light to thereby reduce the width or size of an overall optical system using the prism by bending an optical path or folding the optical path. However, use of only a normal prism does not enable variation of the focal length of the prism itself since it is a solid element. There are examples of the addition of various constituent elements to an optical system using a prism to execute zoom or focus. The optical element disclosed in Japanese Patent Laid-Open No. 2008-191647 disposes a transmissive liquid lens for varying a focal length in proximity to the incident side or emission side of a three-sided prism. The transmissive liquid lens is a lens that is subjected to electrowetting driving (EW driving) to vary the radius of curvature of the boundary surface between an electrolyte solution and a non-electrolyte solution by application of a voltage. Furthermore, the optical system disclosed in Japanese patent Laid-Open No. 2001-4809 enables further a decrease in thickness or a wider angle, in particular, by dividing the angle of view with reference to the imaged object and forming the overall component as a divided prism. This optical system disposes a plurality of units of prisms and variable mirrors (deformable mirrors) in each division of the field of view for the imaged object to thereby focus each variable mirror on each divided field of view. Furthermore, use of a reflective liquid lens has been disclosed in Japanese patent Laid-Open No. 2007-121980 in relation to a transmissive liquid lens. This reflective liquid lens is configured from a transparent liquid and a magnetic fluid that enables variation of the radius of curvature of the magnetic fluid as a result of the strength of the magnetic field applied to the magnetic fluid.

However, the liquid lens employed in the optical element disclosed in Japanese patent Laid-Open No. 2008-191647 is only transmissive. Furthermore, a light beam in the optical system disclosed in Japanese patent Laid-Open No. 2001-4809 repeats emission and incidence using a prism in the optical path. Therefore, a chromatic aberration may be produced in a refractive surface that has a refractive power (optical power). Furthermore, the optical element disclosed in Japanese patent Laid-Open No. 2008-191647 and the optical system disclosed in Japanese patent Laid-Open No. 2001-4809 dispose an optical element that enables variation of the focal length (hereinafter referred to as "variable element") in proximity to the prism. However, when taking into consideration preventing interference between the variable element and the prism, the overall size of the optical system is increased. For example, when executing a zoom operation, at least two variable surfaces are required to function respectively as a variator and compensator. Therefore, since at least three constituent elements having one prism and two variable elements are required as an optical system, the dimensions or adjustment processing steps are increased, and therefore results in a corresponding cost increase. Furthermore, although the reflective liquid lens disclosed in Japanese patent Laid-Open No. 2007-121980 is controlled by use of a magnetic field control method on the magnetic fluid, practical application is not enabled since the mechanism used for magnetic control is relatively large, and response characteristics are poor.

SUMMARY OF THE INVENTION

According to the present invention, a prism enabling variation of a focal length is provided that is useful in relation to optical performance and enables reduction of dimensions.

According to an aspect of the present invention, the prism enabling variation of a focal length includes a first transmissive solution body, a second transmissive solution body that has a different refractive index to that of the first transmissive solution body, and a reflective solution body. The shape of the transmissive surface and the reflective surface is varied by electrical control of the transmissive surface formed at the interface between the first transmissive solution body and the second transmissive solution body, and the reflective surface formed at the interface of the second transmissive solution body and the reflective solution body.

According to the present invention, a prism enabling variation of a focal length is provided that is useful in relation to optical performance and enables reduction of dimensions.

Further features of the present invention will become apparent from the following description of embodiments with reference to the attached drawings.

BRIEF DESCRIPTION OF THE EMBODIMENTS

First Embodiment

Figure 1:
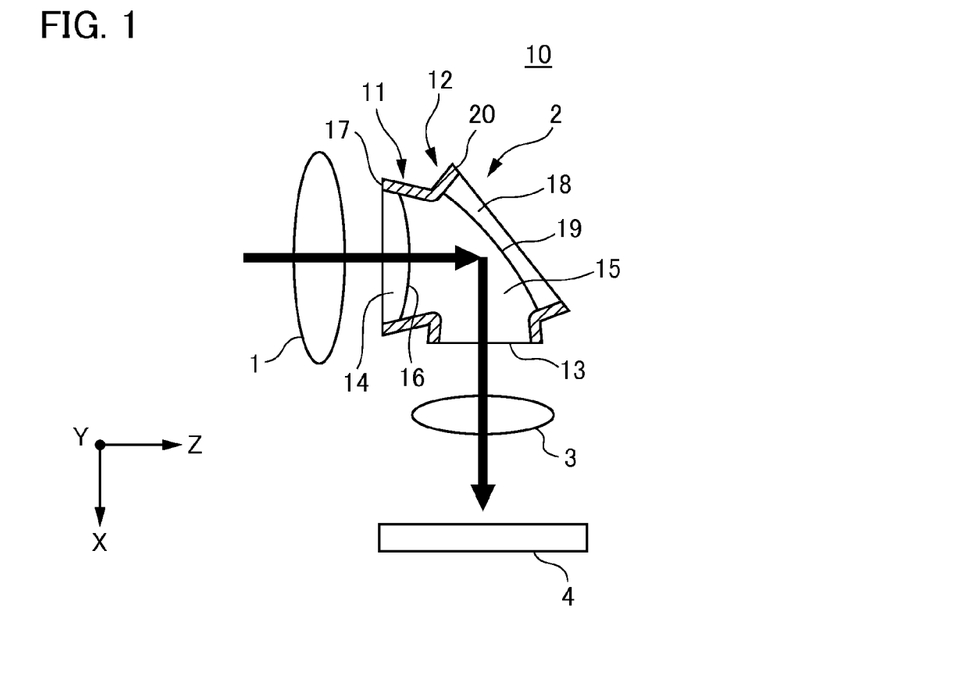
FIG. 1 is a schematic view illustrating the configuration of an optical system according to a first embodiment of the present invention.

Firstly, an optical system using a variable focus prism (a prism enabling variation of a focal distance) according to a first embodiment of the present invention will be described. FIG. 1 is a schematic view illustrating the configuration of an optical system according to a first embodiment of the present invention. In FIG. 1, an explanation will be provided using a Z axis in a direction from the imaged object towards the optical system, and an X axis and a Y axis in a perpendicular direction and a horizontal direction on a plane perpendicular to the Z axis. The optical system 10 enables variation of the focal distance, and for example, can be applied to a zoom optical system or the like having a 90-degree curvature that is adopted by a thin digital camera. The same comments apply to each embodiment of the optical system. In order from the imaged object, the optical system 10 includes a first fixed focal point optical system 1, an overall prism 2 for varying a focal length, a second fixed focal point optical system 3, and an imaging element 4. The first fixed focal point optical system 1 is not required when enabling further reduction in thickness. The second fixed focal point optical system 3 may be a conventional zoom optical system. In this case, the second fixed focal point optical system 3 is operably connected with the zoom of the overall prism described below. Furthermore, the imaging element 4 for example is a sensor such as a CCD or a CMOS.

The overall prism 2 is a prism that enables variation of a focal length as a characteristic of the present embodiment, and includes a transmissive portion 11 forming an incident surface for light beams, a reflective portion 12 that forms a reflective surface that is configured with an eccentric 45° tilt with respect to the transmissive portion 11, and an emission surface 13 that emits a light beam reflected by the reflective portion to the outside. The transmissive portion 11 is a liquid prism that disposes a first electrolyte solution on the side near to the imaged object and disposes a non-electrolyte solution body 15 on the transmission side to thereby form a first interface surface (transmissive surface) 16. The transmissive portion 11 varies the shape (radius of curvature) of the first interface surface 16 by electrowetting driving, that is to say, by application of a voltage from a substantially circular first electrode 17 disposed on an outer peripheral portion. In the present embodiment, the first electrolyte solution body 14 is configured as a mixed solution of water as the first transmissive solution and an NaCl electrolyte solution. On the other hand, the non-electrolyte solution body 15 is silicon oil acting as the second transmissive solution. In this case, the first interface surface 16, that is a transmissive-body variable surface, functions as a compensator and focus portion in the optical system 10. The reflective portion 12 forms a second interface surface (reflective surface) 19 by disposing the non-electrolyte solution body 15 near to the imaged object and disposing the second electrolyte solution body 18 on the reflecting side. The reflective portion 12 varies the shape of the second interface surface 19 by application of a voltage from a substantially circular second electrode 20 disposed on an outer peripheral portion. In the present embodiment, the second electrolyte solution body 18 is configured by any of mercury, aluminum solution, or silver solution as the reflective solution body. In this case, the second interface surface 19 that is a reflective-body variable surface functions as a zoom variator in the optical system 10. The emission surface 13 is not configured as a liquid lens but is a surface formed simply by the non-electrolyte solution body 15. The overall prism 12 in the present embodiment includes surfaces through which light passes including an incident surface, a first interface surface 16, a second interface surface 19 (reflective surface), and an emission surface 13.

The non-electrolyte solution body 15 of the reflective portion 12 is integrated with the non-electrolyte solution body 15 that configures the transmissive portion 11 as illustrated in FIG. 1 and forms an internal prism including a reflective surface. Since the volume of the internal prism, that is to say, the volume of the non-electrolyte solution body 15 necessarily occupies the majority of the volume of the overall prism 2, the volume of the non-electrolyte solution body 15 is preferably at least four times greater than the sum of the volume of the electrolyte solution body that forms the transmissive portion 11 and the reflective portion 12. In this manner, a reduction may be enabled in relation to power consumption for controlling the shape of each interface surface 16, 19.

The first electrolyte solution body 14 and the second electrolyte solution body 18 that are the constituent elements of the transmissive portion 11 and the reflective portion 12 in the overall prism 2 are separated from each other by the non-electrolyte solution body 15. Therefore, as illustrated in FIG. 1, a control portion for controlling the applied voltage configures the integrated electrode as a ground by integrating the electrodes 17, 20 in an electrode connecting portion 2a that forms the base point of the angle subtended by the first electrode 17 and the second electrode 20. In this case, the control portion is operably connected to the shape of the plurality of interface surfaces (first interface surface 16 and second interface surface 19) and executes electrical control by application of a voltage respectively to the first electrolyte solution body 14 and the second electrolyte solution body 18. In this manner, the structure for application of the voltage can be simplified, and the control portion can execute separate control of the shape of the first interface surface 16 and the second interface surface 19. The common/share application of the electrode enables simplification of the structure of the overall prism 2.

Generally, a zoom optical system is associated with a large angle of incidence to the incident surface of the maximum viewing-angle beam on the wide-angle side and a small angle of incidence to the incident surface of the maximum viewing-angle beam on the telephoto-side. However, when the difference in the incident angle is large, that is to say, as the magnification of the zoom in an optical system increases, there is an increase in the difficulty in relation to optical design and there is a strong possibility that the size of the optical system will increase. In this regard, the angle of incidence can be reduced by disposing a transmissive portion 11 forming the first interface surface 16 on the incident side of the overall prism 2 and setting the first interface surface 16 on the wide-angle side to have a strong negatively refractive power. Conversely, the angle of incidence remains small by mitigating the negative refractive power of the first interface surface 16 on the telephoto-side. In this manner, the angle of the light beam that passes through the first interface surface layer 16 is similar in a wide angle and telephoto configuration. Thereafter, a zoom magnification modification operation is almost unnecessary, and therefore enables downsizing of the optical system 10.

Furthermore, the variable value of the focal distance resulting from the shape change on the first interface surface 16 that is a transmissive-body variable surface is determined by the difference in the refractive index of the first electrolyte solution body 14 and the non-electrolyte solution body 15. For example, when the mixed solution is configured by use of the first electrolyte solution body 14, the refractive index is n=1.4, and when silicon oil (A) is used as the non-electrolyte solution body 15, the refractive index is n=1.55. Therefore the difference $\Delta n$ in the refractive indexes is a small value of $\Delta n=0.15$, and it is difficult to configure a large fluctuation range in relation to the focal distance. On the other hand, the variable value of the focal distance on the second interface surface 19, which is a reflective-body variable surface, is determined by the refractive index+1 of the non-electrolyte solution body 15. For example, since the refractive index in the non-electrolyte solution body 15 is n=1.55, the variable value is 1.55+1=2.55. That is to say, since the reflective portion 12 forms a reflective surface (second interface surface 19) by application of the reflective solution body, in comparison with the transmissive surface (first interface surface 16) that uses the transmissive solution body, the fluctuation range in the focal distance even under the same shape change can be increased to 2.55/0.15=17 times. Furthermore in the present embodiment, since the second interface surface 19, which is a reflective-body variable surface, functions as a zoom variator, generation of chromatic aberration can be suppressed.

In the present embodiment, although a silicon oil (A) having a refractive index of n=1.55 is used as the non-electrolyte solution body 15, there is no limitation on the non-electrolyte solution body 15, and it is preferred that the refractive index is n≥1.55. When the refractive index n of the non-electrolyte solution body 15 is greater than 1.55, the air-equivalent optical path length of the internal prism that is filled with the non-electrolyte solution body 15 is reduced, and enables an effective downsizing of the internal prism. On the other hand, when the refractive index n is smaller than 1.55, the difference of the refractive index between the first electrolyte solution body 14 and the non-electrolyte solution body 15 in the transmissive portion 11 is reduced, and as a result, the variable amount in the focal length enabled by the first interface surface 16 is reduced.

As described above, according to the overall prism 2 of the present embodiment, the overall prism 2, which is advantageous in terms of optical performance, such as reducing chromatic aberration and the amount of variation of the focal distance, is attained by one downsized component. Furthermore, the overall prism 2 uses each electrode in common as a ground, and therefore reduces the cost of the overall prism 2 or the overall optical system 10 in addition to simplifying the structure of the lens barrel that contains the optical system 10.

Second Embodiment

Figure 2:
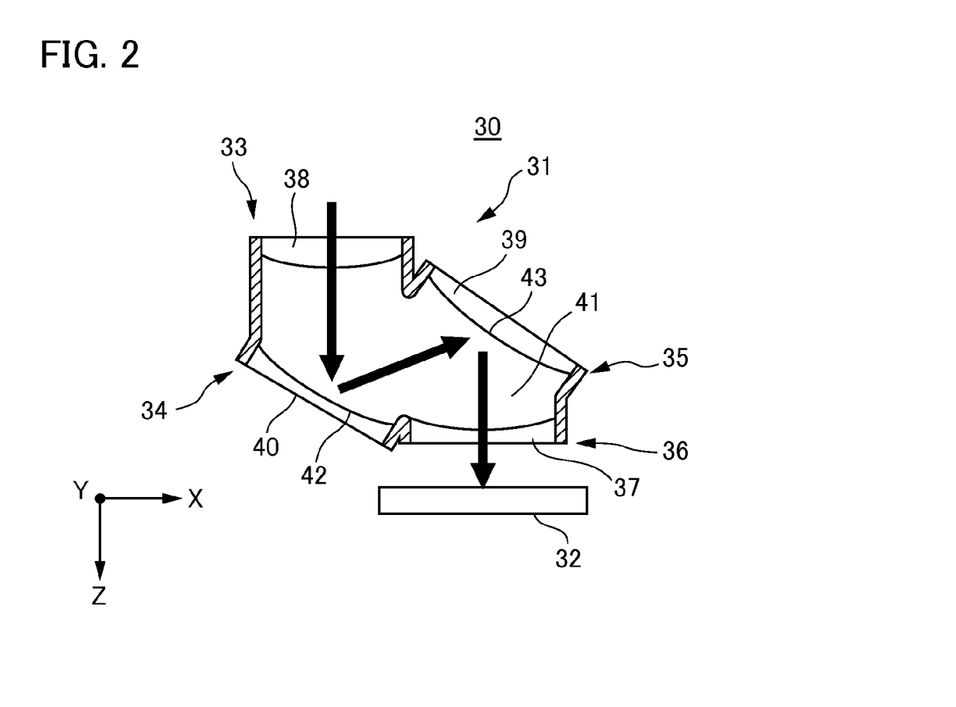
FIG. 2 is a schematic view illustrating the configuration of an optical system according to a second embodiment of the present invention.

Next, an optical system that uses a variable focus prism according to a second embodiment of the present invention will be described. FIG. 2 is a schematic view illustrating the configuration of an optical system 30 according to a second embodiment of the present invention. Each of the figures illustrates the structure of the overall prism that characterizes each embodiment and the disposition of the imaging element, and other constituent elements are omitted. The overall prism 31 in each embodiment is a prism enabling modification of a focal length configured from four surfaces being an incident surface, two reflective surfaces and an emission surface in contrast to a configuration of three light transmissive surfaces as in the overall prism 2 in the first embodiment. In this configuration, the overall prism 31 includes a first transmissive portion 33 forming an incident surface for light beams, and a first reflective portion 34 that forms a reflective surface configured with a substantially eccentric 30° tilt with respect to the first transmissive portion 33. The overall prism 31 further includes a second reflective portion 35 that receives light beams reflected by the first reflective portion 34 and forms a reflective surface configured with a substantially eccentric 30° tilt with respect to a second transmissive portion 36, and the second transmissive portion 36 that forms an emission surface for light beams reflected by the second reflective portion 35 and guides those light beams to the imaging element 32.

The configuration of the first transmissive portion 33 and the second transmissive portion 36 is respectively the same as the transmissive portion 11 according to the first embodiment. Furthermore, the configuration of the first reflective portion 34 and the second reflective portion 35 is respectively the same as the configuration of the reflective portion 12 according to the first embodiment. However, provided that a fourth electrolyte solution body 37 that configures the second transmissive portion 36 is a transmissive solution body, it may be configured from the same or a different material to a first electrolyte solution body 38 that configures the first transmissive portion 33. In the same manner, provided that a third electrolyte solution body 39 that configures the second reflective portion 35 is a reflective solution body, it may be configured from the same or a different material to a second electrolyte solution body 40 that configures the first reflective portion 34. In either case, each electrolyte solution body 37-40 is disposed in proximity to the common non-electrolyte solution body 41 in the same manner as the overall prism 2 according to the first embodiment. In the present embodiment, the non-electrolyte solution body 41 is preferably configured by a silicon oil (B) (refractive index n=1.6) that has a different refractive index to the silicon oil used in the first embodiment. Furthermore, a second interface surface 42 and a third interface surface 43 that are the reflective liquid variable surfaces in the first reflective portion 34 and the second reflective portion 35 have a function of a zoom variator and compensator in the optical system 30. Furthermore, the configuration of the overall prism 31 enables a configuration of at least one group of each electrode applying a voltage to each electrolyte solution body 37-40 in the same manner as the overall prism 2 according to the first embodiment.

In this manner, in addition to the effect of the first embodiment, the overall prism 31 according to the present embodiment enables reduction of a thickness in relation to the tilting direction (Z direction in the figure) by folding of the optical path through application of two reflective liquid variable surfaces (the second interface surface 42 and the third interface surface 43). Furthermore, the reflective liquid variable surfaces as described above increase the fluctuation in the focal length and therefore enable expansion of the zoom magnification while reducing production of a chromatic aberration and reduction fluctuation.

Third Embodiment

Figure 3:
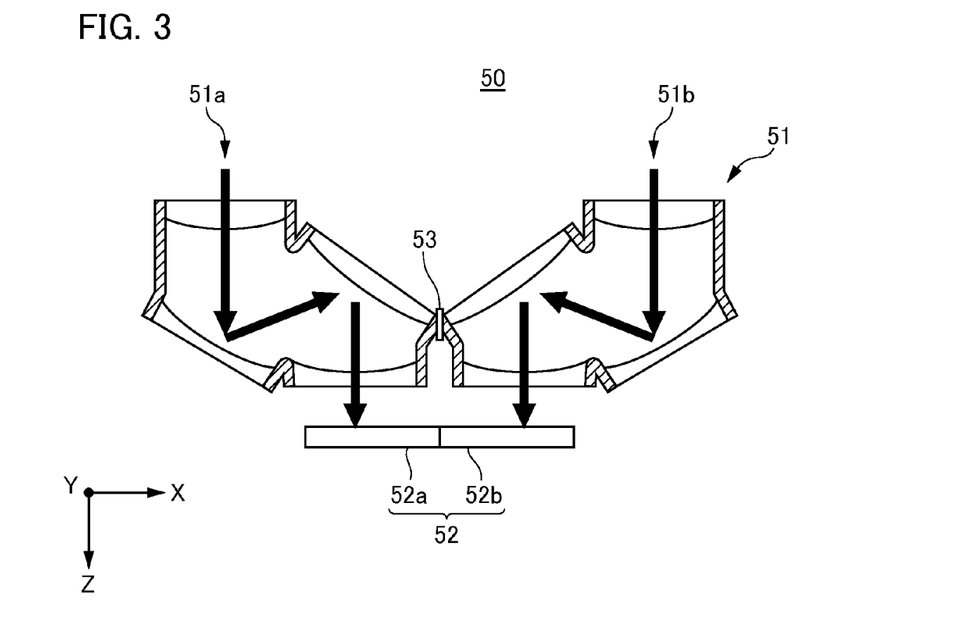
FIG. 3 is a schematic view illustrating the configuration of an optical system according to a third embodiment of the present invention.

Next, an optical system that uses a variable focus prism according to a third embodiment of the present invention will be described. FIG. 3 is a schematic view illustrating the configuration of an optical system 50 according to a third embodiment of the present invention. The overall prism 51 according to the present embodiment is a prism that enables variation of a focal length and has a configuration in which the overall prism 31 according to the second embodiment is provided in a symmetrical arrangement on the right and the left (mirror image) via an insulating member 53 with respect to the imaged object, and divides the viewing angle with respect to the imaged object into a left side and a right side. Furthermore, the imaging element 52 according to the present embodiment includes two imaging elements being a first imaging element 52a that receives a light beam introduced from one divided optical system 51a and a second imaging element 52b that receives a light beam introduced from the other divided optical system 51b that configure the overall prism 51. In this case, the first imaging element 52a that is positioned on the left with reference to the imaged object is disposed with a certain deviation to the right in a horizontal direction with respect to the incident light to thereby receive light on the left side of the light receiving surface when light is introduced from the divided optical system 51a positioned in the same manner to the left. On the other hand, the second imaging element 52b that is positioned on the right with reference to the imaged object is disposed with a certain deviation to the left in a horizontal direction with respect to the incident light to thereby receive light on the right side of the light receiving surface when light is introduced from the divided optical system 51b positioned in the same manner to the right. In this manner, without any modification to the thickness thereof, an optical system can double the angle of view, for example, can combine a viewing angle of 30 degrees on a single normal incident surface on the right and the left to thereby increase the viewing angle to 60 degrees. Furthermore, the right and left optical systems of the overall prism 51 are connected through the insulating member 53, and therefore enable a common configuration for each electrode that applies a voltage to each electrolyte solution body in the respective right and left optical systems in the same manner as the overall prism 31 according to the second embodiment. In this manner, in addition to the effect of the second embodiment, the overall prism 51 according to the present embodiment enables the viewing angle of each divided optical system 51a, 51b to be half the viewing angle of the optical system 30 according to the second embodiment, and thereby enables a further reduction in a thickness. For example, this optical system 50 can execute a zoom operation even at a thickness of 2 to several millimeters. In the present embodiment, although the number of imaging elements 52 corresponds to the number of divisions in the viewing angle, common/shared use in a right and left direction is enabled with a single imaging element 52. Common use of the imaging element is the same in the following embodiments.

Fourth Embodiment

Figure 4:
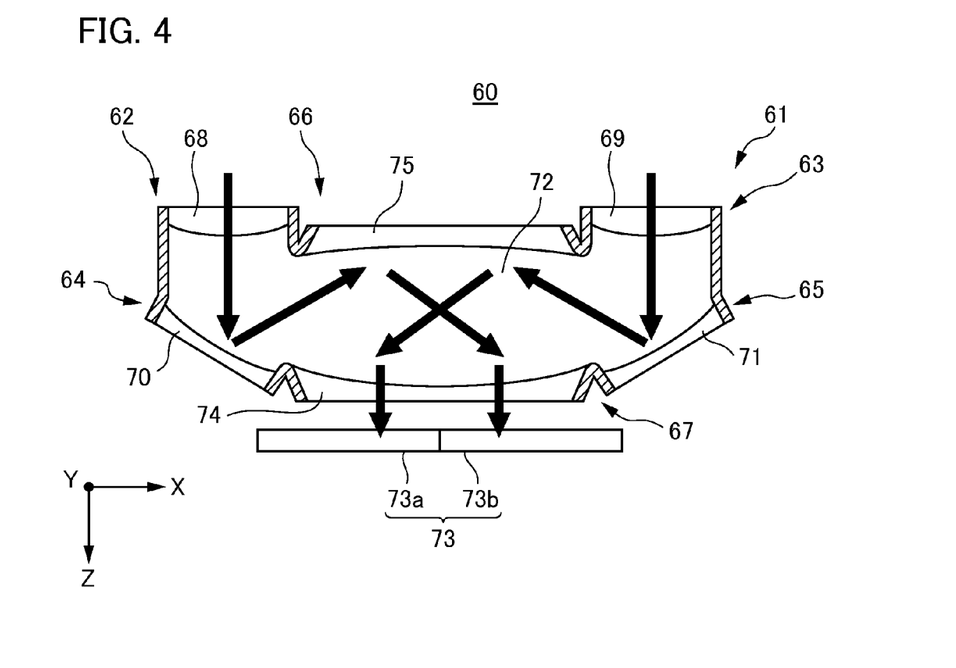
FIG. 4 is a schematic view illustrating the configuration of an optical system according to a fourth embodiment of the present invention.

Next, an optical system that uses a variable focus prism according to a fourth embodiment of the present invention will be described. FIG. 4 is a schematic view illustrating the configuration of an optical system 60 according to the present embodiment. The overall prism 61 according to the present embodiment is a prism that enables variation of a focal length and has a configuration in which the left and right divided optical systems 51a, 51b that configure the overall prism 51 according to the third embodiment are combined, that is to say, a common configuration is provided in relation to the internal prism formed by the non-electrolyte solution body. In this case, the overall prism 61 includes a first transmissive portion 62 and second transmissive portion 63 on the right and left to thereby form an incident surface for light beams, and a first reflective portion 64 and second reflective portion 65 that form a reflective surface respectively configured with substantially an eccentric 30° tilt with respect to the first transmissive portion 62 and second transmissive portion 63. The overall prism 31 further includes a third reflective portion 66 that receives light beams that are reflected respectively by the first reflective portion 64 and second reflective portion 65 and forms a reflective surface configured substantially in parallel with respect to the first transmissive portion 62 and second transmissive portion 63, and a third transmissive portion 67 that forms an emission surface for light beams reflected by the third reflective portion 66. In the same manner as the embodiments above, each electrolyte solution body 68, 69, 74 that configures each transmissive portion 62, 63, 67 is a transmissive solution body, and each electrolyte solution body 70, 71, 75 that configures each reflective portion 64, 65, 66 is a reflective solution body. As illustrated in FIG. 4, the configuration of the overall prism 61 enables intersection of light beams reflected by the third reflective portion 66 when propagating into the third transmissive portion 67 in a non-electrolyte solution body 72 that is adjacent to each incident surface, reflective surface, and emission surface. Furthermore, the imaging element 73 according to the present embodiment is formed from two left and right imaging elements 52 being the first imaging element 73a and the second imaging element 73b in the same manner as the imaging element 52 according to the third embodiment. However, in the present embodiment, since the light beams intersect in the non-electrolyte solution body 72, in the opposite configuration to the first imaging element 52a according to the third embodiment, the first imaging element 73a positioned on the left with reference to the imaged object is disposed with a certain deviation to the left in a horizontal direction with respect to the incident light. On the other hand, the second imaging element 73b that is positioned on the right with reference to the imaged object is also disposed with a certain deviation to the right in a horizontal direction with respect to the incident light. Since the non-electrolyte solution body 72 in the overall prism 61 according to the present embodiment is used in a common configuration in the right and left optical systems, all electrodes in the right and left optical systems include a common configuration as a ground. In this manner, the overall prism 61 according to the present embodiment applies a common use configuration to the third reflective portion 66 and the third transmissive portion 67 in the right and left optical systems, and therefore reduces control on the zoom and the focus and simplifies the configuration in comparison with the overall prism 51 according to the third embodiment.

Fifth Embodiment

Figure 5:
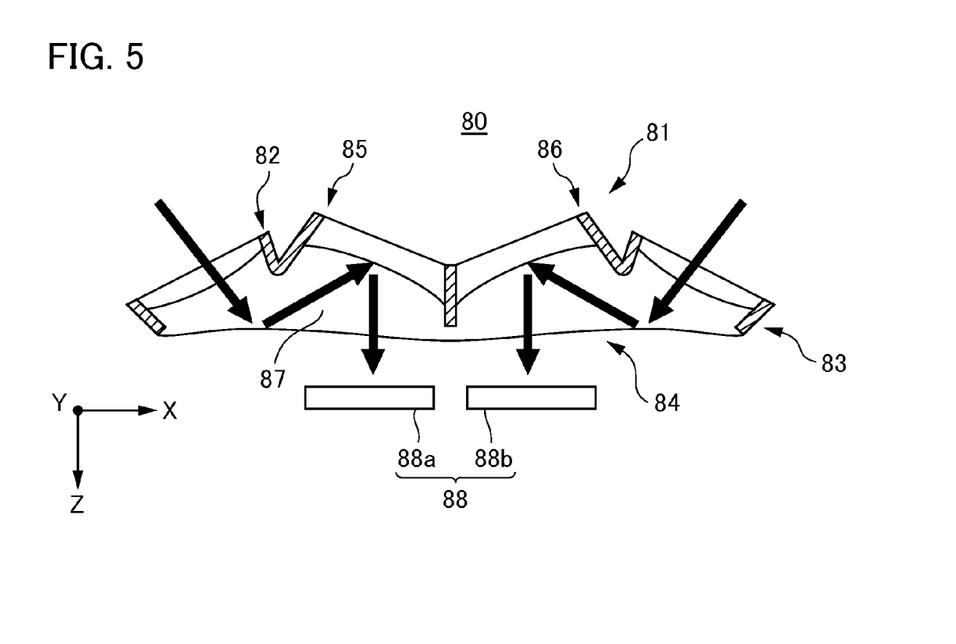
FIG. 5 is a schematic view illustrating the configuration of an optical system according to a fifth embodiment of the present invention.

Next, an optical system that uses a variable focus prism according to a fifth embodiment of the present invention will be described. FIG. 5 is a schematic view illustrating the configuration of an optical system 80 according to a fifth embodiment of the present invention. The overall prism 81 according to the present embodiment is a prism that modifies the configuration of the overall prisms 50 and 60 according to the third and the fourth embodiments, and that includes a reflective transmissive surface that functions as an overall reflective surface and transmissive surface in response to critical angle conditions. In this case, the overall prism 81 includes a right and left first transmissive portion 82 and second transmissive portion 83 forming an incident surface with an eccentric configuration in relation to the imaged object, and a reflective transmissive portion 84 configured with a substantially eccentric 30° tilt respectively with respect to the first transmissive portion 82 and second transmissive portion 83. The overall prism 81 further includes a right and left first reflective portion 85 and second reflective portion 86 that receive light beams that are reflected by the reflective transmissive surface 84 and subsequently reflect the light beams again with respect to the reflective transmissive portion 84. The first reflective portion 85 and a second reflective portion 86 also guide light beams to the reflective transmissive surface 84, and therefore are respectively configured with a substantially eccentric 30° tilt respectively with respect to the reflective transmissive surface 84. Furthermore, a non-electrolyte solution body 87 that is adjacent to each transmission portion 82, 83 and each reflective portion 85, 86 is used in common by the left and right optical systems in the same manner as the fourth embodiment. In contrast to the above embodiments, the right and left imaging elements 88a, 88b in the optical system 80 are such that light beams from the imaged object are inclined at respective gradients by the right and left optical systems, that is to say, are incident in a viewing angle that is eccentric with respect to the imaged object. Therefore, there is no necessity for the imaging elements 88a, 88b to be disposed with a deviation with respect to the incident light. In this manner, in addition to the effect of the fourth embodiment, the overall prism 81 according to the present embodiment adopts a reflective transmissive surface 84 in response to critical angle conditions, and includes both the functions of the whole reflective surface and transmissive surface on the same surface to thereby enable further reduction in thickness.

Sixth Embodiment

Figure 6:
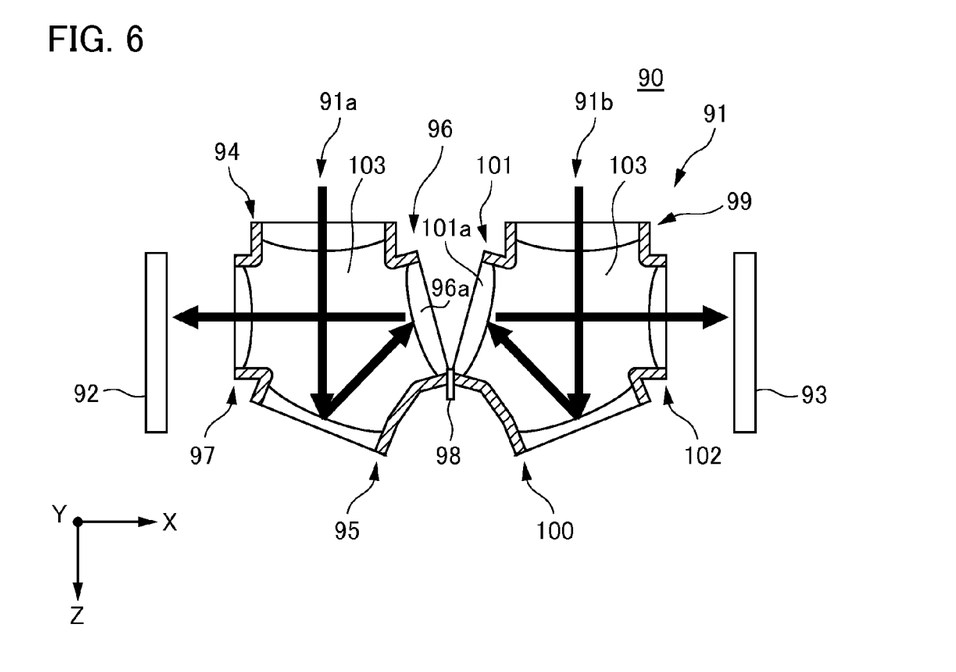
FIG. 6 is a schematic view illustrating the configuration of an optical system according to a sixth embodiment of the present invention.
Figure 7:
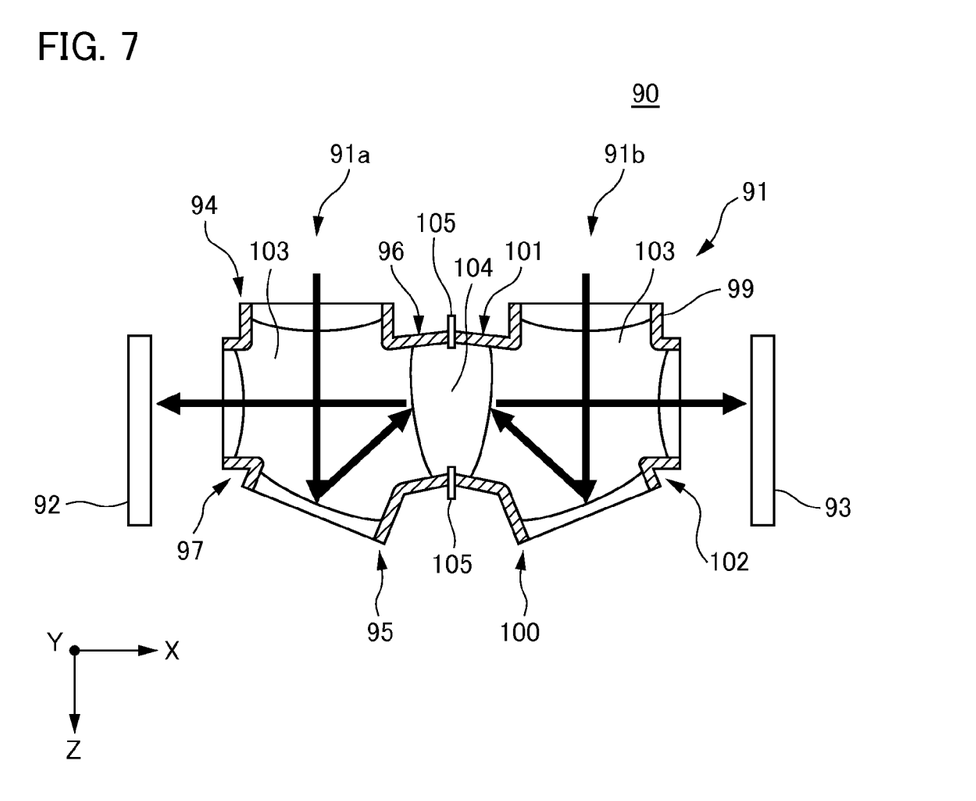
FIG. 7 is a schematic view illustrating the configuration of an optical system according to another embodiment of the present invention.

Next, an optical system that uses a variable focus prism according to a sixth embodiment of the present invention will be described. FIG. 6 is a schematic view illustrating the configuration of an optical system 90 according to the present embodiment. In the same manner as the overall prism 50 according to the third embodiment, the overall prism 91 according to the present embodiment is a prism that modifies the focal length and has a configuration in which the viewing angle is divided with respect to the imaged object into a left side and a right side. Furthermore, in contrast to the overall prism 50, the overall prism 91 configures an emission surface to guide emitted light respectively to the two right and left imaging elements 92, 93 provided in a perpendicular direction (X direction) with respect to the direction of incidence (Z direction) of the light beams from the imaged object. In this case, the left divided optical system 91a that configures the overall prism 91 includes a first transmissive portion 94 forming an incident surface in relation to light beams, and a first reflective portion 95 forming a reflective surface respectively configured with a substantially eccentric 30° tilt with respect to the first transmissive portion 93. The divided optical system 91a further includes a second reflective portion 96 that forms a reflective surface that receives light beams that are reflected by the first reflective portion 95 and reflects the light beams to intersect in a vertical direction with the light beams that pass through the first transmissive portion 94. The divided optical system 91a further includes a second transmissive portion 97 that forms an emission surface for light beams that are reflected by the second reflective portion 96 and guides the light beams to the imaging element 92. The right divided optical system 91b that configures the overall prism 91 also has the same configuration based on right-left symmetrical configuration with the left divided optical system 51b with respect to the insulating member 98 (reference numerals 99-102). The configuration of each transmissive portion 94, 97 and each reflective portion 95, 96, and the formation of the internal prism by a non-electrolyte solution body is the same as the third embodiment. In the present embodiment, the first imaging element 92 that is disposed on the left side with reference to the imaged object is disposed with a certain deviation to the right in a horizontal direction with respect to the incident light (lower side of the Z direction) to thereby receive light on the left side of the light receiving surface when light is introduced from the left divided optical system 91a. On the other hand, the second imaging element 93 that is positioned on the right with reference to the imaged object is disposed with a certain deviation to the left in a horizontal direction with respect to the incident light (lower side of the Z direction) to thereby receive light on the right side of the light receiving surface when light is introduced from the right divided optical system 91b. In this manner, in addition to the effect of the third embodiment, the overall prism 91 according to the present embodiment enables a reduction in the volume of the overall prism 91 since the optical path in the overall prism 91 has the same configuration as the number "4", and therefore improves volumetric efficiency. As illustrated in FIG. 7, the optical system 90 enables common/shared use as a single electrolyte solution body 104 of the electrolyte solution body 96a, 101a of the second reflective portions 96, 101 that configure the right and left divided optical systems 91a, 91b. However in this case, the insulating member 105 that respectively insulates each electrode that configures the second emission portions 96, 101 is provided at two positions.

While the embodiments of the present invention have been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese patent No. 2010-283595 filed Dec. 20, 2010 which are hereby incorporated by reference herein it their entirety.

What is claimed is:

1. A variable focus prism comprising:
a first transmissive solution body;
a second transmissive solution body that has a different refractive index as compared to the first transmissive solution body; and
a reflective solution body comprising a reflective solution throughout the reflective solution body,
wherein a shape of a transmissive surface and a reflective surface is varied by electrical control of the transmissive surface formed on an interface between the first transmissive solution body and the second transmissive solution body, and by electrical control of the reflective surface formed on an interface between the second transmissive solution body and the reflective solution body,
wherein the variable focus prism further comprises a plurality of electrodes for varying the shape of the transmissive surface and the reflective surface, and
wherein at least one group of electrodes of the plurality of electrodes is formed in a common or shared configuration, and electrical control is executed by varying a voltage applied to the first transmissive solution body and the reflective solution body.

2. The variable focus prism according to claim 1, wherein: the first transmissive solution body and the reflective solution body are configured by an electrolyte solution body; and
the second transmissive solution body is configured by a non-electrolyte solution body.

3. The variable focus prism according to claim 1, wherein the first transmissive solution body is disposed on an incident surface for light beams.

4. The variable focus prism according to claim 2, wherein the volume of the second transmissive solution body configured by the non-electrolyte solution body is at least four times the sum of the volume of the first transmissive solution body and the reflective solution body configured by the electrolyte solution body.

5. The variable focus prism according to claim 1, wherein the refractive index of the second transmissive solution body is greater than or equal to 1.55.

6. An optical system having at least one prism and an imaging element for receiving light beams passing through the prism, wherein:
the prism is a variable focus prism, and the variable focus prism comprises:
a first transmissive solution body;
a second transmissive solution body that has a different refractive index as compared to the first transmissive solution body; and
a reflective solution body comprising a reflective solution throughout the reflective solution body, wherein a shape of a transmissive surface and a reflective surface is varied by electrical control of the transmissive surface formed on an interface between the first transmissive solution body and the second transmissive solution body, and by electrical control of the reflective surface formed on an interface between the second transmissive solution body and the reflective solution body, wherein the variable focus prism further comprises a plurality of electrodes for varying the shape of the transmissive surface and the reflective surface, and wherein at least one group of electrodes of the plurality of electrodes is formed in a common or shared configuration, and electrical control is executed by varying a voltage applied to the first transmissive solution body and the reflective solution body.

* * * * *